(12) United States Patent
Yashiro et al.

(10) Patent No.: US 8,687,262 B2
(45) Date of Patent: Apr. 1, 2014

(54) ION CONDUCTOR AND ELECTROCHROMIC DISPLAY DEVICE

(75) Inventors: Tohru Yashiro, Kanagawa (JP); Shigenobu Hirano, Kanagawa (JP); Koh Fujimura, Tokyo (JP); Yoshihisa Naijo, Kanagawa (JP); Yoshinori Okada, Kanagawa (JP); Hiroyuki Takahashi, Kanagawa (JP); Akishige Murakami, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

(21) Appl. No.: 13/316,697

(22) Filed: Dec. 12, 2011

(65) Prior Publication Data

US 2012/0154892 A1   Jun. 21, 2012

(30) Foreign Application Priority Data

Dec. 17, 2010   (JP) .................................. 2010-282033
Nov. 9, 2011    (JP) .................................. 2011-245726

(51) Int. Cl.
*G02F 1/153* (2006.01)
*G02F 1/15* (2006.01)

(52) U.S. Cl.
CPC ................ *G02F 1/1525* (2013.01); *G02F 1/15* (2013.01)
USPC ............................ 359/270; 359/265; 359/267

(58) Field of Classification Search
USPC ................................................. 359/238–270
See application file for complete search history.

(56) References Cited

U.S. PATENT DOCUMENTS

| 6,301,083 | B1 | 10/2001 | Fitzmaurice et al. |
| 7,639,415 | B2 | 12/2009 | Jung et al. |
| 7,894,118 | B2 | 2/2011 | Hirano et al. |
| 2005/0077498 | A1* | 4/2005 | Kato et al. ................. 252/299.2 |
| 2009/0231664 | A1 | 9/2009 | Shibuya et al. |
| 2009/0256157 | A1 | 10/2009 | Kondo et al. |
| 2010/0142027 | A1* | 6/2010 | Tatsuura et al. ............... 359/268 |
| 2010/0326825 | A1* | 12/2010 | Hane et al. .................... 204/431 |
| 2011/0222139 | A1 | 9/2011 | Naijo et al. |
| 2011/0279884 | A1 | 11/2011 | Fujimura et al. |

FOREIGN PATENT DOCUMENTS

| JP | 2002-287172 | 10/2002 |
| JP | 3955641 | 5/2007 |
| JP | 2007-194150 | 8/2007 |
| JP | 2008-304906 | 12/2008 |
| JP | 2010-33016 | 2/2010 |

* cited by examiner

*Primary Examiner* — Mahidere Sahle
(74) *Attorney, Agent, or Firm* — Cooper & Dunham LLP

(57) ABSTRACT

An ion conductor includes a mixture including an electrolyte including a salt including inorganic or organic pairs of negative and positive ions, and a low-molecular liquid crystal material. Further, an impedance of the ion conductor varies in accordance with an increase of a voltage applied to the ion conductor due to an orientation response of the low-molecular liquid crystal material, the impedance being determined by an AC impedance method.

12 Claims, 8 Drawing Sheets

ELECTRODE_1

ELECTRODE_2

ION CONDUCTOR AND ELECTROCHROMIC DISPLAY DEVICE

CROSS-REFERENCE TO RELATED APPLICATION

The present application claims priority under 35 U.S.C §119 to Japanese Patent Application Nos. 2010-282033 filed Dec. 17, 2010, and 2011-245726 filed Nov. 9, 2011, the entire contents of which are hereby incorporated herein by reference.

BACKGROUND OF THE INVENTION

1. Field of the Invention

The present invention generally relates to an ion conductor and an electrochromic display device, and more particularly to a new ion conductor in which ion mobility may be changed by an applied voltage, and an electrochromic display device using the ion conductor and having faster response speed of coloring and decoloring and excellent memory characteristics.

2. Description of the Related Art

Recently, extensive research has been made in the field of an electronic paper as an electronic medium which is replacing a paper medium. Although being a display device, the electronic paper is expected to be used just like ordinary paper. Therefore, among the requests for the electronic paper, there may be characteristics which are different from those for traditional displays such as a CRT (Cathode Ray Tube) and an LCD (Liquid Crystal Display). Namely, for example, the electronic paper may be requested to have characteristics as a reflective display device, to have a higher white reflectivity and a higher contrast ratio, to display high-resolution images, to be a display having a memory effect, to operate even with a low voltage input, to be thin and light weight, and to be inexpensive. Among those, there are strong demands for having the same white reflectivity and contrast ratio as that of paper as the characteristics directly related to the quality of the display.

As a display method used in the display devices for an electronic paper use, for example, there are a method of using a reflective liquid crystal, a method of using cataphoresis, and a method of using a toner migration. However, when any of the above method is used, it may still be very difficult to display multiple colors while maintaining a higher white reflectivity and a higher contrast ratio. Generally, to display multiple colors, a color filter may be used. The color filter, however, may absorb light, and therefore, the reflectivity may be reduced. Also, by using the color filter, one pixel is divided into three regions (i.e., red (R), green (G), and blue (B) regions). Therefore, the reflectivity of the display device may be reduced and the contrast ratio may be reduced accordingly. When the white reflectivity and the contrast ratio are greatly reduced, the visibility may also be degraded. As a result, it may become difficult to use the display device as such as an electronic paper.

On the other hand, there is one potential technique of providing the reflective display device using an electrochromic phenomenon without using a color filter. The electrochromic phenomenon is also called electrochromism in which when a voltages is applied, based on the polarity of the voltage, redox reactions occur, so that the color is reversibly changed. A display device using color development and color disappearance (hereinafter may be simplified as "coloring/decoloring") of an electrochromic compound that induces the electrochromism (electrochromic) phenomenon is called an electrochromic display device. The electrochromic display device may be used an electronic paper display device because the electrochromic display device is a nonradiative display device, has a memory effect (i.e., memory characteristics to maintain a color and an image for a necessary time period), and operates with a lower voltage input.

On the other hand, the electrochromic display device may have the drawback of a slow response speed in coloring/decoloring (developing and disappearing a color) because the coloring/decoloring is performed based on redox reactions. For example, Japanese Patent No. 3955641 discloses a technique of improving the response speed of coloring/decoloring by fixing (disposing) the electrochromic compound near the electrode. However, the electrochromic is an electrochemical phenomenon. Therefore, it is the characteristics of an electrolyte layer (e.g., ion conductivity) that may largely influence the response speed or the memory effect of developed color. Further, when the electrolyte layer is in a liquid form where electrolyte is dissolved in a solvent, faster response speed (responsiveness) may be achieved. On the other hand, when the electrolyte layer is in a liquid form, the strength and the reliability of the device may be degraded. Therefore, to improve the strength and the reliability of the display device, researches have been made to solidify or gelatinize the electrolyte layer.

Namely, conventionally, in the battery and the electrochromic display device, an electrolyte solution is generally used. Therefore, a leakage of the electrolyte solution, and drying in the battery due to the volatilization of the solvent may occur. Further, in a typical battery case, the electrolyte solution may be unevenly distributed. Due to the uneven distribution of the electrolyte solution, a part of a separation membrane may dry. As a result, internal impedance may increase and an internal short-circuit may also occur. Especially, the electrochromic display device is used for a display purpose. Therefore, it may at least be necessary that one direction (side) of the electrochromic display device is made of a transparent material such as glass, plastic or the like. Therefore, in the electrochromic display device, it may be difficult to completely seal the electrolyte with a metal or the like. As a result, in the electrochromic display device, leakage of the electrolyte solution and drying in the battery due to volatilization of the solvent may become a serious problem.

To resolve the problem, a method of using a polymer solid electrolyte is proposed. More specifically, a solid solution made of matrix polymer and inorganic salt is proposed. In this case, the matrix polymer includes an oxyethylene chain or an oxypropylene chain. However, this solid solution is a perfect solid. Therefore, it may be easy to process the solid solution, but the electrical conductivity of the solid solution is three orders lower than that of a normal non-aqueous electrolyte solution. This lower electrical conductivity may be a (serious) problem in practical use.

Further, to improve (reduce) the volatility, there are proposals of including a liquid crystal material into the electrolyte layer. In one example, a polymer liquid crystal material is included into the electrolyte layer. By doing this, the volatility of the electrolyte layer may be improved (reduced), and the adhesiveness to the electrochromic layer may be improved (e.g., Japanese Laid-open Patent Publication No. 2002-287172). In another example, an ion conductor is disclosed in which the ion conductivity between the electrodes (in the vertical direction) is improved by including (combining) the electrolyte and a specific low-molecular nematic liquid crystal material (e.g., Japanese Laid-open Patent Publication No. 2007-194150).

However, the electrolyte layers in related art may not be sufficient for the electrochromic display use. Namely, the drive response may be improved due to the improved ion conductivity of the low-volatile electrolyte layer. On the other hand, condurrently, the memory effect of the image display is more likely to be degraded. This may occur because, generally, the electrochromic reaction is not bistable.

The display pixels of the electrochromic display device have characteristics similar to those of a capacitor in that a charge is stored. Further, when a voltage is applied to the pixel, electricity is conducted to a pixel (i.e., the pixel is turned ON) so that the color is developed while the electricity is charged. After the electricity is charged, an open-circuit configuration is formed so as to maintain the colored state. This is what is called memory effect (hereinafter may be referred to as "memory characteristics"). In this open-circuit configuration, however, when ions diffusively move in the electrolyte layer, the oxidation state or the reduction state may become unstable. As a result, it may become difficult to maintain the charged colored state. Especially, when the ion conductivity of the electrolyte layer is relatively high (e.g., when the electrolyte layer is a liquid state), ions are more likely to diffusively move. As a result, the display image may blur.

As a display device, from a viewpoint of the display resolution and the display speed, it is preferable that the display device has a configuration so that a color is independently developed and disappeared (hereinafter may be referred to as "colored and discolored") in each of the pixel electrodes which are formed in a matrix manner. However, when this configuration is used in, for example, a high-resolution display, the blur in the display image may become remarkable. Further, as an element configuration, to form a drive circuit for a TFT (Thin Film Transistor), it is preferable that an element electrode having a lower light transmission rate is disposed on the opposite rear side (as a counter electrode opposing to the display electrode) and a sheet electrode having a higher light transmission rate such as ITO (Indium Thin Oxide) is disposed as a display electrode from a viewpoint of the light use efficiency and color quality. However, when this configuration is used, the blurring speed of the display image may be increased. This is because it is thought that electric charges are more likely to move in the sheet electrode direction due to the higher light transmission rate.

To resolve the problem, Japanese Laid-open Patent Publication No. 2008-304906 proposes a technique in which the electrolyte layer is formed only on a part corresponding to the display image to prevent the diffusion, so that only selected pixels are displayed. However, this configuration may be too complicated, so that it may be difficult to manufacture this configuration, and the cost may be greatly increased.

On the other hand, in Japanese Laid-open Patent Publication No. 2010-33016, the inventors of the present invention propose the electrochromic display device having a configuration in which a plurality of display electrodes and the corresponding electrochromic layers are accumulated on a display substrate. In this electrochromic display device, it may become possible that a plurality of colors are independently developed using a simple method, so as to display a color image. Further, in this electrochromic display device (of Japanese Laid-open Patent Publication No. 2010-33016), as the electrolyte of the display device, perchlorate chloride and the like is used, and no electrolyte in a liquid crystal state is used.

As described above, in the electrochromic display device in related art, it may still be difficult to achieve sufficient response speed in coloring and decoloring a color, sufficient memory characteristics, and sufficient reliability of the devices.

SUMMARY OF THE INVENTION

According to an aspect of the present invention, an ion conductor includes a mixture that including an electrolyte including a salt including inorganic or organic pairs of negative and positive ions, and a low-molecular liquid crystal material. Further, an impedance of the ion conductor varies in accordance with an increase of a voltage applied to the ion conductor due to an orientation response of the low-molecular liquid crystal material, the impedance being determined by an AC impedance method.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

Figure 1:
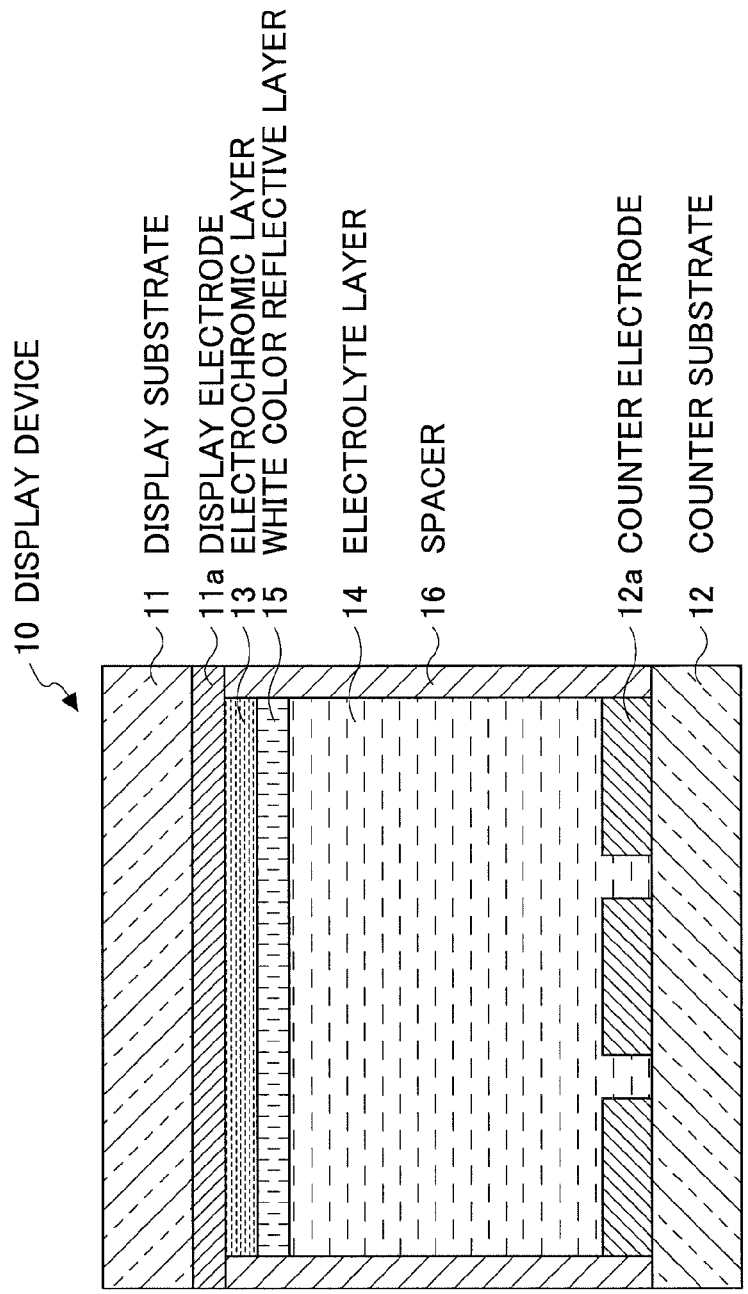
FIG. 1 is a schematic drawing illustrating a configuration of an electrochromic display device according to an embodiment of the present invention.

The present invention is made in light of the above circumstances and may resolve at least one of the above problems, and may provide a new ion conductor in which the impedance may be controlled by applying a voltage and that is useful to the electrochromic display device, and may also provide a low-volatile and reliable electrochromic display device using the ion conductor so as to have faster response speed in coloring and decoloring and an excellent memory characteristics.

As a result of extensive studies by the inventors of the present invention, the inventors have found that the invention described below may resolve at least one of the problems in the electrochromic display devices in related art.

According to an embodiment of the present invention, an ion conductor includes a mixture including an electrolyte and a low-molecular liquid crystal material, the electrolyte including a salt including at least one of inorganic and organic pairs of negative and positive ions. Further, the ion conductor has an impedance value which varies (changes) when an applied voltage is increased. This change is based on a response in which the low-molecular liquid crystal material is oriented (orientation response).

The feature that a liquid crystal material is oriented when a voltage is applied may be used in some liquid crystal display and the like. Depending on the differences in the orientational state of the liquid crystal, the liquid crystal displays may be classified into various types including a TN (Twisted Nematic) type, a VA (Vertical Alignment) type, IPS (In-Plane Switching) type, an OCB (Optically Compensated Bend) type and the like. Further, various liquid crystal materials have also been developed.

In an ion conductor according to an embodiment, by combining electrolyte ions with a liquid crystal material, it may become possible to change the moving speed of the electrolyte ions based on the orientation of the liquid crystal due to voltage application.

In a case where the above ion conductor is used as the electrolyte layer for the electrochromic display device, by controlling in a manner such that when a voltage is applied (i.e., when the display device is driven), the ion conductivity becomes high (i.e., the impedance becomes low), and when an open circuit configuration is formed for memory display mode (to maintain the display due to the memory effect), the ion conductivity becomes low (i.e., the impedance becomes high), it may become possible to provide an electrochromic display device having a faster response speed of coloring and decoloring, the excellent memory characteristics, with little blur in the display image (without reducing resolution), lower volatility, and higher reliability.

In such a liquid crystal material, it is preferable that liquid crystals are vertically oriented between the display electrode and the counter electrode. From that point of view, it is preferable that a nematic liquid crystal is used. Further, it is preferable that the molecular weight of the liquid crystal material is equal to or less than 1000, and that the liquid crystal material is a monomer (monomolecular compound). Namely, when the molecular weight of the liquid crystal material is greater than 1000 and/or when the liquid crystal material is a polymer compound, the response speed of the orientation is more likely to be reduced, and also the resolvability and the compatibility of the electrolyte are more likely to be reduced.

In the nematic liquid crystal, the liquid crystal may be vertically oriented between the electrodes (i.e., between the display electrode and the counter electrode) when a voltage is applied. Therefore, the impedance of the electrolyte layer may be greatly reduced when the liquid crystal is driven (i.e., when a drive voltage is applied). As a result, it may become possible to increase the ion conductivity. Namely, it may become possible to increase an ion conductivity ratio which is a ratio of the ion conductivity ratio when the liquid crystal is driven to the ratio of the ion conductivity ratio when the liquid crystal is not driven. Especially, it is preferable to use a low-molecular liquid crystal material of biphenyl derivative containing a cyano group.

Further, it is preferable that the electrolyte is a quaternary ammonium salt. The quaternary ammonium salt is well resolvable and compatible with a nematic liquid crystal material such as a biphenyle-based liquid crystal material, a phenylcuclohexane-based liquid crystal material, an ester-based liquid crystal material and the like. Therefore, when the electrolyte layer is formed by using an ion conductor made of a mixture of the quaternary ammonium salt and the nematic liquid crystal material (a low-molecular liquid crystal material having the molecular weight equal to or less than 1000), it may become possible to easily increase the coloring and decoloring response speed. The quaternary ammonium salt includes, but is not limited to, a general tetraalkylammonium salt, imidazolium salt, and pyridinium salt.

As the electrolyte, any appropriate electrolytic material may be used as long as the material may be resolved into and compatible with the liquid crystal material. The electrolyte may be a solid or a solution. The electrolyte in a liquid form may be called an ionic liquid.

Further, when the liquid crystal material has ionicity, the electrolyte may not be used.

In the electrochromic display device, it is preferable that an impedance change rate, calculated based on the following formula, of the ion conductor as the impedance change when a drive voltage is applied is equal to or greater than 20%.

$$\text{impedance change rate}(\%) = [([R_{0.1}] - [R_m])/[R_{0.1}]] \times 100$$

Wherein, $[R_{0.1}]$ denotes the AC (Alternating-Current) impedance when 0.1 V is applied, and $[R_m]$ denotes the AC impedance when a control voltage is applied.

The control voltage varies depending on the material and element configuration. Normally, a voltage equal to or greater than 1 V is applied as the drive voltage.

Further, an electrochromic display device according to an embodiment satisfies any one of the requirements <1> and <2> described below, and the electrolyte layer is formed of a mixture containing an electrolyte and a low-molecular liquid crystal material, the electrolyte including a salt including at least one of inorganic and organic pairs of negative and positive ions. Further, the ion conductor has an impedance value which varies due to an orientational response of the low-molecular liquid crystal material when an applied voltage is increased.

<1>: The electrochromic display device includes a display substrate, a display electrode, one or more counter electrodes, an electrochromic layer being in contact with a surface of the display electrode, the surface being on a counter electrode side, and an electrolyte layer formed between the display electrode and the counter electrodes, so as to perform redox reactions in the electrochromic layer so as to color and decolor colors.

<2>: The electrochromic display device includes a display substrate, a counter substrate, one or more counter electrodes formed on the counter substrate, an electrolyte layer formed between the display substrate and the counter electrodes, a plurality of display electrodes formed between the display substrate and the counter electrodes and separated from each other, and an electrochromic layer formed on the display electrodes to face the counter electrodes, so as to perform redox reactions in the electrochromic layer to color and decolor colors.

In the electrochromic display device, when a color is colored and decolored in the electrochromic layer (i.e., when the electrochromic layer is colored or decolored), by changing (varying) the impedance of the electrolyte layer formed of the mixture (i.e., the ion conductor) of the electrolyte and the low-molecular liquid crystal material, when the drive voltage is applied, the ion conductivity of the ion conductor is controlled to have a higher ion conductivity value so that the response speed of coloring and decoloring the electrochromic layer is increased. On the other hand, when the drive voltage is not applied (when not being driven), the ion conductivity of the ion conductor is controlled to have a lower ion conductivity value so that the display (color) is maintained (unchanged). Therefore, it may become possible to easily provide an electrochromic display device having an excellent memory effect (memory characteristics).

Namely, by forming the electrochromic layer using the ion conductor described above and changing the liquid crystal orientation state (i.e., changing the orientation direction of the liquid crystal) by applying the drive voltage (control voltage) similar to the conventional liquid crystal displays, it may become easier for the electrolyte ions to move when the drive voltage is applied compared with the electrolyte ions when the drive voltage is not applied. As a result, it may become possible to easily provide an electrochromic display device having a faster response speed of coloring and decoloring, excellent memory characteristics with little blur in a display image (without reducing resolution), lower volatility, and higher reliability, and capable of displaying single or multiple colors.

Further, in the electrochromic layer formed of the ion conductor, it is preferable that the contained amount of the electrolyte (electrolyte content) including a salt including at least one of inorganic and organic pairs of negative and positive ions is equal to or greater than 0.2 wt % and equal to or less than 2.0 wt %.

By setting the range of the electrolyte content in this way, it may become possible to easily provide an electrochromic display device capable of coloring and decoloring based on ion movement and controlling the translational diffusion amount of electrolyte ions and having excellent memory characteristics.

Further, it is preferable that the electrochromic layer includes the ion conductor and a solvent and the ratio of the solvent content to the total amount of the electrochromic layer is equal to or less than 10 wt %.

By adding the solvent, it may become possible to dissolve the solid electrolyte, which may be difficult to be dissolved in a liquid crystal material (without the solvent), while maintaining the liquid crystal effect (characteristics). Therefore, it may become possible to increase the probability of using various types of electrolytes to expand the usage of the display device.

Further, in the electrochromic layer, it is preferable that a nano-structure semiconductor carries (supports) an electrochromic compound.

By forming the electrochromic layer in which the nano-structure semiconductor carries the electrochromic compound by adsorption, binding or the like, due to the surface area effect of the nano structure, the response speed of coloring and decoloring may be increased and diffusional movement of the ionized electrochromic compound to the electrochromic layer may be prevented. Therefore, it may become possible to easily provide an electrochromic display device having excellent memory characteristics.

Further, it is preferable that the counter electrodes are divided into pixels and the display electrode is formed so as to be larger than the pixel (in size).

By having such an electrode configuration, it may become possible to form the pixel electrode part having a reduced (lower) light transmissibility by formation of a drive circuit such as the TFT on the rear surface opposite side (i.e., set as the counter electrode) and form a sheet electrode having higher light transmissibility such as the ITO as the display electrode. As a result, it may become possible to easily provide an electrochromic display device having excellent light use efficiency, color quality, faster response speed of coloring and decoloring, and memory characteristics.

Further, by forming a liquid crystal orientation layer on the surface of the counter electrode, it may become easier to control the orientation of the liquid crystal when no drive voltage is applied (i.e., when an open circuit configuration is formed without applying a voltage). Further, it may become possible to increase the range of the impedance change rate. The liquid crystal orientation layer may be formed by using polyimide resin or the like which is known as a material used in a liquid crystal display.

Further, the forming region of the liquid crystal orientation layer may correspond to the entire surface on the pixel electrode side. However, alternatively, the liquid crystal orientation layer may be formed only on the surface of the pixel electrodes or formed only between the pixel electrodes (i.e., bank parts). Especially, the bank parts are generally formed of a polyimide material. In this case, it is preferable because the bank material may serve as the liquid crystal orientation layer as well.

Next, a preferred embodiment of the present invention is described with reference to the accompanying drawings.

FIG. 1 schematically illustrates an example configuration of the electrochromic display device according to an embodiment of the invention.

As illustrated in FIG. 1, an electrochromic display device (hereinafter may be simplified as "display device") 10 includes a display substrate 11, a display electrode 11a formed on the display substrate 11, a counter substrate 12, counter electrodes 12a formed on the counter substrate 12 so as to face the display electrode 11a and be separated from the display electrode 11a by a predetermined distance, an electrochromic layer 13 being in contact with the display electrode 11a, an electrolyte layer 14 provided so as to be sandwiched between the display electrode 11a and the counter electrodes 12a, and a white color reflective layer 15 formed on the electrochromic layer 13 and on the counter substrate 12 side of the electrochromic layer 13.

The electrolyte layer 14 is formed of an ion conductor according to an embodiment of the present invention. The ion conductor herein refers to a mixture of an electrolyte and a low-molecular liquid crystal material. The electrolyte includes a salt which includes at least one of inorganic and organic pairs of negative and positive ions. Further, the ion conductor has an impedance that varies in accordance with an increase of an applied voltage (applied between the display electrode 11a and the counter electrodes 12a of the electrochromic display device 10) due to an orientation response of the low-molecular liquid crystal material. Herein, the impedance is measured by using an AC (Alternating Current) impedance method. By having this configuration, when a voltage is applied between the display electrode 11a and the counter electrodes 12a facing the display electrode 11a via the electrolyte layer 14, the electrolyte ions in the electrolyte layer 14 moves, so that the electrochromic layer 13 receives electric charges from the display electrode 11a. By receiving the electric charges from the display electrode 11a, redox reactions are performed in the electrochromic layer 13. As a result of the redox reactions in the electrochromic layer 13, coloring and decoloring occurs.

The region where coloring and decoloring (hereinafter coloring/decoloring region) of the electrochromic layer 13 corresponds to a shape of the electrodes to which a voltage is applied. In FIG. 1, the counter electrodes 12a are formed as pixel electrodes. In this case, coloring and decoloring is driven only at the regions where a voltage is applied from among the counter electrodes 12a. The display device 10 serves as a reflective display device when reflected light of the white color reflective layer 15 is recognized (visually detected) via the electrochromic layer 13 from the display substrate 11 side. The display substrate 11 and the counter substrate 12 are adhered (connected) together via a spacer 16.

Figure 2:
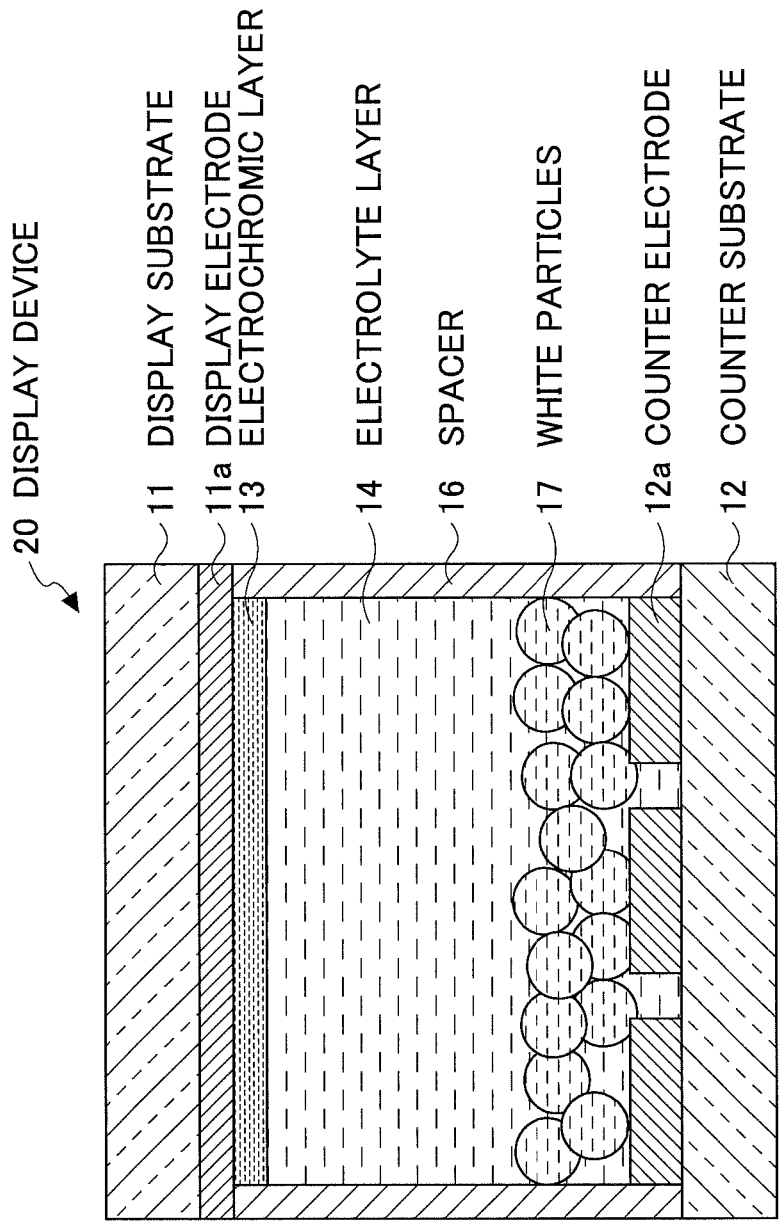
FIG. 2 a schematic drawing illustrating another configuration of an electrochromic display device according to the embodiment of the present invention.

FIG. 2 schematically illustrates another example configuration of the electrochromic display device 20 according to the embodiment of the present invention.

The configuration (modified example of the electrochromic display device 10) of the electrochromic display device 20 in FIG. 2 is similar to that of the electrochromic display device 10 except that the electrolyte layer 14 includes white particles (white coloring particles) 17 to be served as a white color reflective layer. Therefore, repeated descriptions of the elements described above may be herein omitted.

Figure 3:
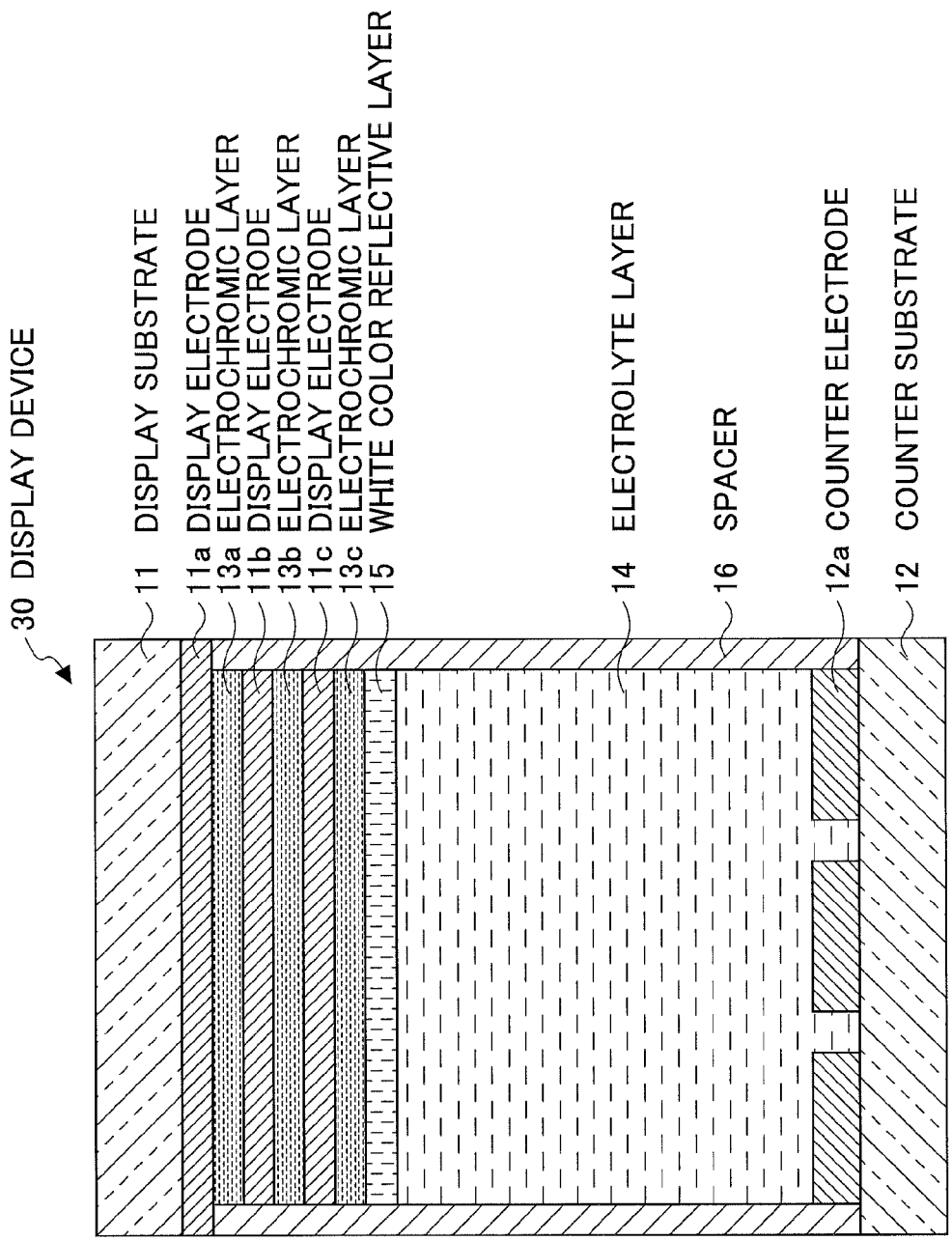
FIG. 3 a schematic drawing illustrating still another configuration of an electrochromic display device according to the embodiment of the present invention.

FIG. 3 schematically illustrates a still another example configuration of the electrochromic display device 30 according to the embodiment of the present invention. The configuration of the electrochromic display device 30 in FIG. 3 (as an another modified example of the electrochromic display device 10) is similar to that of the electrochromic display device 10 except that a pair of the display electrode 11a and the electrochromic layer 13a, a pair of the display electrode 11b and the electrochromic layer 13b, and a pair of the display electrode 11c and the electrochromic layer 13c, are formed and sequentially laminated from the display substrate 11 side so as to have a multiple-electrode-layer configuration, the display electrode 11a to 11c being separated from each other.

In the configuration of FIG. 3 described above, different electrochromic compounds may be included in the electrochromic layers 13a, 13b, and 13c so as to color and decolor different colors (e.g., yellow (Y), magenta (M), and cyan (C)) in the electrochromic layers 13a, 13b, and 13c. Further, by setting the electrical resistance between a first display electrode and a second display electrode to be greater than the electrical resistance of the first electrode, a laminated color display may be achieved. Generally, the electrical resistance depends on the film thickness of the electrochromic layer. However, if it is difficult to set the electrical resistance between the first display electrode and the second display electrode to be greater than the electrical resistance of the first electrode, it is preferable to form an isolation layer between the electrochromic layer 13a and the display electrode (layer) 11b and/or between the electrochromic layer 13b and the display electrode (layer) 11c. In this configuration, the electrolyte layer 14 may penetrate to the entire display electrode 11a and the counter electrodes 12a.

In the following, materials of the elements in the configuration are described.

As the material of the display electrode 11a, 11b, and 11c, any appropriate material having conductive property (electrical conductivity) may be used. However, more precisely, since it is necessary to transmit light through the display electrodes, a transparent and electrically conductive material having (sufficient) light permeability and excellent electrical conductivity is used. By using the display electrode having such characteristics, it may become possible to improve the visibility of the developed colors. As the transparent and electrically conductive material, an inorganic material such as tin-doped indium oxide (hereinafter simplified as "ITO"), fluorine-doped tin oxide ("FTO"), antimony-doped tin oxide ("ATO") may be used. However, it is preferable that the inorganic material includes any one of indium oxide ("In oxide"), tin oxide ("Sn oxide"), and zinc oxide ("Zn oxide") which are formed using a vacuum film formation method. The films of the In oxide, the Sn oxide, and the Zn oxide are easily formed by using a sputtering method. Further, the In oxide, the Sn oxide, and the Zn oxide have excellent transparency and electrical conductivity. More preferable materials to be used in the display electrodes are InSnO, GaZnO, SuO, $In_2O_3$, ZnO or the like.

A material of the display substrate 11 includes, for example, a glass or a plastic. When a plastic film is used as the display substrate 11, a light and flexible display device may be easily formed.

In this embodiment, as the electrolyte layer 14, an ion conductor according to an embodiment of the present invention is used. The ion conductor include (containing) a mixture of an electrolyte (an electrolyte salt or an ionic liquid) and a low-molecular liquid crystal material. The electrolyte includes a salt including at least one of inorganic and organic pairs of negative and positive ions. Further, the impedance, which is measured (determined) by using the AC impedance method, of the mixture (i.e., the ion conductor) varies in accordance with an increase of the applied voltage due to the orientation response of the low-molecular liquid crystal material.

As a material of the electrolyte salt (as a salt), an inorganic ionic salt such as an alkali metal salt, an alkaline-earth metal salt, and the like, a quaternary ammonium salt, an acid, or an alkali salt may be used. Specifically, $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, $Mg(BF_4)_2$, $N(C_4H_9)_4ClO_4$, $N(C_4H_9)_4Cl$, $N(C_4H_9)_4BF_4$, $N(C_4H_9)_4PF_6$, $N(C_2H_5)_4Br$, $N(C_4H_9)CH_2C_6H_5Cl$, $N(C_8H_{17})_4Br$, or the like may be used.

Further, in the ionic liquid, as positive ions, ammonium series ions such as imidazolium salts, pyridinium salts, phosphonium series ions, ions not relevant to any series, or the like may be used. As negative ions, halogen series ions such as bromide ions, triflate and the like, boron series ions such as tetraphenylborate, phosphorus series ions such as hexafluorophosphate and the like may be used.

Among those, as the electrolyte material, it is preferable to use the quaternary ammonium salt. This is because the quaternary ammonium salt is easy to be mixed with the low-molecular liquid crystal material. More preferably, a quaternary ammonium salt having at least one alkyl chain carbon number equal to or greater than 4 such as $N(C_4H_9)_4ClO_4$, $N(C_4H_9)_4Cl$, $N(C_4H_9)_4BF_4$, $N(C_4H_9)_4PF_6$, $N(C_8H_{17})_4Br$, or that like, an imidazolium salt, a pyridinium salt or the like may be used. Those salts are more likely to be mixed with the low-molecular liquid crystal material. Those electrolytes may be used alone or may be used in combination thereof.

In the electrolyte layer formed of the ion conductor, it is preferable that a ratio of the electrolyte content (containing a salt including inorganic or organic pairs of negative and positive ions) to the electrolyte layer is equal to or greater than 0.2 wt % and equal to or less than 30 wt %. More preferably, the ratio is equal to or greater than 0.2 wt % and equal to or less than 2.0 wt %. When the ratio is greater than 30 wt %, the liquid crystal characteristics may be degraded and ions may become more likely to move in the electrolyte layer, which may cause blur in the coloring/decoloring region.

On the other hand, as the low-molecular liquid crystal material, any appropriate material may be used as long as the material dissolves the electrolyte or is compatible with the electrolyte and is in a liquid crystal state in a driving temperature range of the device. Further, as the low-molecular liquid crystal material, it is also preferable that the liquid crystal is oriented in response to the applied drive voltage of the electrochromic display device to improve the memory characteristics and/or that the low-molecular liquid crystal material is a nematic liquid crystal in which the liquid crystal is more likely to be vertically oriented between the electrodes when a drive voltage is applied.

As the low-molecular liquid crystal material, a material which has been used as the material for a liquid crystal display may be directly used. For example, a compound having a configuration illustrated in a general formula (1) or the like may be used. However, the material that may be used as the low-molecular liquid crystal material is not limited to the material having the configuration of the general formula (1).

However, it is preferable that the material includes a compound having a dielectric anisotropy equal to or greater than 10. This is because when the dielectric anisotropy is greater, it may become easier to dissolve the electrolyte having an ionic character.

Further, when the electrochromic layer of the electrochromic display device is colored, it is preferable that the impedance of the electrolyte layer is reduced by 20% or more. As described above, when the reduction rate of the impedance is less than 20%, the memory characteristics may not be sufficiently obtained.

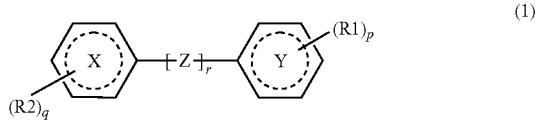

(1)

In formula (1), a symbol "R1" denotes any of an alkyl group having a carbon number in a range from 1 to 20, an aryl group having a carbon number in a range from 1 to 20, an alkoxy group having a carbon number in a range from 1 to 20, a halogen atom, and a hydrogen atom, and may have an independent substituent group. A symbol "p" denotes an integer in a range from 1 to 5. A symbol "R2" independently denotes CN, a halogen atom, or a hydrogen atom. A symbol "q" denotes an integer in a range from 1 to 5. A symbol "Z" denotes "—COO—" or an alkylene having a carbon number in a range from 1 to 6. A symbol "r" denotes an integer in a range from 0 to 2. Ring structures X and Y independently denote an aliphatic monocyclic hydrocarbon structure, a heterocyclic hydrocarbon structure, a condensed polycyclic hydrocarbon structure, or a condensed heterocyclic hydrocarbon structure.

As for a liquid crystal material, a conventionally known liquid crystal material may be used. Extensive research has been widely conducted on such a liquid crystal material from fundamental properties including a phase structure, a transition temperature, and optical properties to application fields such as an optical device (e.g., Liquid crystal=Basic and Applicative, Okano and Kobayashi, Baifu-kan).

As a low-molecular liquid crystal compound (liquid crystal material) used in an embodiment, it is preferable that the molecular weight of the liquid crystal compound is equal to or less than 10,000, and more preferably, equal to or less than 1,000. When the molecular weight of the liquid crystal compound exceeds 10,000, it may become difficult for the electrolyte to dissolve and the orientation response of the liquid crystal upon a voltage being applied may become slower. From the viewpoints of rapid coloring/decoloring response and excellent memory characteristics of the electrochromic display device, a liquid crystal compound having the molecular weight equal to or less than 1,000 is especially preferably used.

In addition to the electrolyte and the low-molecular liquid crystal material, the electrolyte layer 14 may further include a solvent. Namely, by adding a solvent, it may become possible to dissolve a solid electrolyte which may be difficult to be dissolved in a liquid crystal material without the solvent. As a result, it may become possible to select the electrolyte from many types of electrolytes. As the solvent, for example, propylene carbonate, acetonitrile, γ-butyrolactone, ethylene carbonate, butylenecarbonate, sulfolane, dioxolan, tetrahydrofuran, 2-methyletetrahydrofuran, dimethylsulfoxide, 1,2-dimethoxyethane, 1,2-ethoxymethoxyethane, polyethyleneglycol, and alcohol may be used. However, preferably, from a viewpoint of device reliability, one low-volatile material having a low boiling point or a combination (mixture) of such materials may be used.

Further, it is preferable that a ratio of the additive amount of the solvent to the total amount of the electrolyte is equal to or less than 10 wt %. When the ratio exceeds 10 wt %, the liquid crystal property may be degraded and ions in the electrolyte layer may be more likely to diffuse, which may cause blur in the coloring/decoloring region.

Further, a curable resin may be additionally included in the electrolyte layer. By doing this, it may become possible to improve the strength of the electrolyte layer and the adhesive strength between the electrodes. Such an electrochromic display device may be easily formed by performing a light curing or a heat curing on the electrolyte layer having been formed between the electrodes.

Further, by dispersing the white particles (white coloring particles) in the electrolyte layer, it may become possible for the electrolyte layer to have a function of the white color reflective layer. The white particles (white coloring particles) includes, but not limited to, metal oxides such as titanium oxide, aluminum oxide, zinc oxide, silicon oxide, cesium oxide, and yttrium oxide. When the electrolyte layer is cured by using light curing resin, if an amount of the white particles is increased, sufficient light may not be available in the electrolyte layer. As a result, the electrolyte layer may not be sufficiently (successfully) cured. Therefore, although a preferable white particle content may vary depending on the thickness of the electrolyte layer, it is preferable that a ratio of the white particle content to the total amount of the electrolyte is in a range from 10 wt % to 50 wt %. The film thickness of the electrolyte layer is determined by a distance between (the first) display electrode and the counter electrodes. The distance (i.e., the film thickness) is typically in a range from 0.1 μm to 200 μm. Preferably, the film thickness is a range from 1 μm to 50 μm. When the film thickness exceeds 50 μm, the electronic charges in the electrolyte layer may become more likely to diffuse. On the other hand, when the film thickness is less than 1 μm, it may become difficult to maintain the characteristics of the electrolyte.

In the electrochromic layer (e.g., 13a, 13b, and 13c in FIG. 3), a material is used that causes color change (i.e., color development and color disappearance) by the redox reactions based on a voltage (difference) applied between the display electrodes (e.g., 11a, 11b, and 11c in FIG. 3) and the counter electrodes (e.g., 12a in FIG. 3). As such a material, a known electrochromic compound of polymer series, a pigment system, a metal complex, a metal oxide and the like may be used. More specifically, as the polymer series or pigment system electrochromic compound, the low-molecular organic electrochromic compounds of azobenzene-based, anthraquinone-based, diarylethene-based, dihydroprene-based, styryl-based, styrylspiropyran-based, spirooxiazine-based, spirothiopyran-based, thioindigo-based, tetrathiafulvalene-based, terephralic acid-based, triphenylmethane-based, triphenylamine-based, naphthopyran-based, viologen-based, pyrazoline-based, phenazine-based, phenylenediamine-based, phenoxazine-based, phenothiazine-based, phthlocyanine-based, fluiran-based, fulgide-based, benzopyran-based, metallocene-based and the like, and an electro conductive polymer compound such as polyanilline, polythiophene and the like may be used.

Among the above, especially preferably, the electrochromic layer includes a dipyridine-based compound as illustrated in the following general formula (2). The coloring/decoloring of the dipyridine-based compound is relatively low. Therefore, even when the electrochromic display device includes a plurality of (several) display electrodes, it may become possible to display color having excellent color value due to a reduction potential.

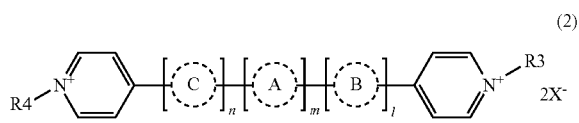

(2)

In formula (2), symbols "R3" and "R4" denote any of an alkyl group having a carbon number in a range from 1 to 8 or an aryl group having a carbon number in a range from 1 to 8 and may have respective independent substituent groups. Further, at least one of "R3" and "R4" includes a substituent group selected from a group consisting of COOH, PO(OH)$_2$, and Si(OC$_k$H$_{2k+1}$)$_3$. A symbol "X" denotes a monovalent anion. Symbols "n", "m", and "l" independently denote "0" or "1". Symbols "A", "B", and "C" denote an aryl group having a carbon number in a range from 2 to 20 or a heterocyclic ring and may include a substituent group.

Those compounds are formed by contacting the electrodes. Especially preferably, the electrochromic compound is in contact with the electrodes while being adsorbed or bonded to a nanostructure semiconductor material. In this method, what is important is that the electrochromic compound may be fixed so as not to move and electrical connection is maintained so that the reception of the electrons in the redox reactions is not prevented. From this point of view, the electrochromic compound and the nanostructure semiconductor material may be mixed to form a single layer.

The material of the nanostructure semiconductor material includes, but not limited to, a metal oxide including, as a main element, titanium oxide, zinc oxide, tin oxide, aluminum oxide (hereinafter "alumina"), zirconium oxide, cerium oxide, silicon oxide ("silica"), yttrium oxide, boric oxide, magnesium oxide, strontium titanate, potassium titanate, barium titanate, calcium titanate, calcium oxide, ferrite, hafnium oxide, tungsten oxide, ferric oxide, copper oxide, nickel oxide, cobalt oxide, barium oxide, strontium oxide, vanadium oxide, aluminum silicate, calcium phosphate, aluminosilicate and the like. Any of the metal oxide may be used alone, and any combination thereof may be used.

From a viewpoint of physical characteristics including electrical characteristics such as electrical conductivity and optical behavior, as the material of the nanostructure semiconductor material, preferably, any material alone which is selected from the group consisting of titanium oxide, zinc oxide, tin oxide, alumina, zirconium oxide, ferric oxide, magnesium oxide, indium oxide, and tungsten oxide or any combination thereof may be used. By doing this, it may become possible to display excellent multi colors with faster response speed in coloring and decoloring.

Further a shape of the nanostructure semiconductor material includes, but not limited to, a shape having a greater surface area per unit volume (hereinafter "specific surface area") to effectively carry the electrochromic compound. The nanostructure semiconductor material having such a shape is used. By having a greater specific surface area, it may become possible to effectively carry the electrochromic compound and display with an excellent contrast ratio of the coloring and decoloring of colors.

It is preferable that the film thickness of the electrochromic layer is in a range from 0.2 μm to 5.0 μm. When the film thickness is less than 0.2 μm, sufficient color density may not be obtained. On the other hand, when the film thickness exceeds 5.0 μm, a manufacturing cost may be increased and the visibility may be degraded due to excessive density of coloring.

FIGS. 4A through 4D schematically illustrate a configuration of the electrochromic display device according to an embodiment displaying colors, and a drive operation of coloring/decoloring processes. More specifically, FIGS. 4A through 4D illustrates a configuration of the electrochromic display device including a laminated structure in which the display electrodes (11a, 11b, and 11c) are laminated with the electrochromic layers 13a, 13b, and 13c which are developing yellow, magenta, and cyan colors as three primary colors, respectively, and counter electrodes as the pixels. Multiple colors may be displayed based on the subtractive color mixing method.

First, the configuration of the electrochromic display device of FIG. 4 is described.

In a laminated configuration in FIG. 4, it may be necessary that any resistance between two of the first display electrode 11a, the second display electrode 11b, and the third display electrode 11c is high enough so that the electrical potential of one of the display electrode relative to the counter electrode (pixel electrode) 12a is controlled independently of the electrical potential of another display electrode relative to the counter electrode 12a. Further, at least, it may be necessary that any resistance between two of the first display electrode 11a, the second display electrode 11b, and the third display electrode 11c ("resistance between display electrodes") is greater than any of the sheet resistance of the first display electrode 11a, the second display electrode 11b, and the third display electrode 11c. In a case where any resistance between two of the first display electrode 11a, the second display electrode 11b, and the third display electrode 11c is less than the any of the sheet resistance of the first display electrode 11a, the second display electrode 11b, and the third display electrode 11c, when a voltage is applied to any of the first display electrode 11a, the second display electrode 11b, and the third display electrode 11c, a similar voltage may also be applied to another display electrode. As a result, it may become difficult to independently color and decolor colors in the electrochromic layers corresponding to the display electrodes. It is preferable that the resistance between display electrodes is 500 times or more higher than the sheet resistance of each of the display electrodes. To obtain such a high resistance, for example, as described above, it is preferable to form an isolation layer (not shown) between the first display electrode 11a and the second display electrode 11b and/or between the second display electrode 11b and the third display electrode 11c. In FIG. 4, the reference numeral 13c, 14, and 15 represent the third electrochromic layer, the electrolyte layer, and the white color reflective layer, respectively.

A material of the isolation layer includes, but not limited to a porous material. More specifically, an organic or inorganic material having excellent insulation property, durability, and film-forming capability may be preferably used.

As a method of forming the porous film, there are several known methods called a sintering method, an extraction method, a foaming method, a phase inversion method, and a radiation emission method. In the sintering method, holes are formed between the particles by adding polymer microparticles and inorganic particles to bind so that those particles are partially fusion bonded. In the extraction method, after a structure layer is formed by using organic or inorganic matter which is soluble in solvent and a binder or the like which is not soluble in the solvent, the organic or inorganic matter is dissolved by a solvent to form fine pores. In the foaming method, high molecular weight polymer is foamed by, for example, heating and expelling air remaining in the polymer. In the phase inversion method, by operating (using) good solvent and poor solvent to separate the phases of the mixture of the polymers. In the radiation emission method, various types of radiations are emitted to form file pores.

As a specific example of the porous film, there is a polymer mixing particulate film including inorganic nanostructure particles (such as $SiO_2$ particles and $Al_2O_3$ particles) and a polymer binding agent, a porous organic film (polyurethane resin, polyethylene resin), and an inorganic insulating material film formed on a porous film.

As the inorganic film, it is preferable that the material includes ZnS. By including ZnS, it may become possible to rapidly form a film without causing damage to the electrochromic layer in sputtering. Further, a material containing ZnS, ZnO—$SiO_2$, ZnS—SiC, ZnS—Si, ZnS—Ge and the like may be used. In this case, it is preferable that the ZnS content is in a range from approximately 52 mol % to approximately 90 mol % so as to maintain a crystalline state when the isolation layer is formed. From this point of view, especially, preferable materials are ZnO—$SiO_2$(8/2), ZnO—$SiO_2$(7/3), ZnS, ZnS—ZnO—$In_2O_3$—$Ga_2O_3$ (60/23/10/7).

By using the material for the isolation layer, it may become possible to form a thin film having an excellent isolation effect and prevent the degradation of film strength (peeling off of the film) due to the multilayer structure.

As described above, when ZnS or the like is formed by sputtering, first, by forming a porous particle layer as an under coat layer, a porous film of ZnS or the like may be formed. In this case, the above-described nanostructure semiconductor material may be used as a particulate film. However, from the viewpoint of an insulation property, it is preferable that an additional porous particle layer containing silica, alumina or the like is formed so as to form an isolation layer having a double-layered structure. By forming the isolation layer as a porous film using the method described above, it may become possible for the electrolyte layer 14 to penetrate into the isolation layer and the display electrodes 11a, 11b, and 11c. As a result, it may become easier for ion charges to move in the electrolyte layer 14 while redox reactions are performed. Therefore, it may become possible to display multiple colors with rapid response speed in coloring and decoloring colors. Further, the film thickness of the isolation layer is in a range from 20 nm to 1,000 nm. When the film thickness is less than 20 nm, a sufficient isolation property may not be obtained. On the other hand, when the film thickness exceeds 1,000 nm, a manufacturing cost may be increased and the visibility may be degraded due to excessive density of coloring.

A material of the counter substrate 12 is not limited to a specific material, and the material similar to that for the display substrate 11 may be used.

Further, a material of the counter electrode (pixel electrode) 12a is not limited to a specific material, and an appropriate material having an electrical conductivity may be used. When a glass substrate or a plastic substrate is used as the counter substrate 12, as the material of the counter electrode (pixel electrode) 12a, a transparent electrically conductive film such as ITO, FTO, zinc oxide or the like, an electrically conductive metal film such as zinc, platinum or the like, carbon or the like may be used. In this case, the counter electrode 12a is formed on the counter substrate 12 by, for example, vacuum coating or wet coating. On the other hand, when a metal plate of zinc or the like is used as the counter electrode 12a, the counter substrate 12 may also serve as the counter electrode 12a.

Further, it is preferable that a liquid crystal orientation layer is formed on a surface of the counter electrode.

Similar to a liquid crystal display, when the display device is active driven by AM-TFT (Active Matrix, Thin Film Transistors), it is preferable that the bank material is combined with the orientation layer. Generally, the height of the bank is in a range from 0.5 μm to 3 μm.

Further, by forming a material on the counter electrode, the material capable of developing (causing) a reverse reaction of the redox reaction that is developed (caused) by the electrochromic layers 13a, 13b, and 13c, it may become possible to more stably color and decolor colors. Namely, a material, that causes a reduction reaction when the electrochromic layer is colored by oxidation and causes an oxidation reaction when the electrochromic layer is colored by reduction, is used as the counter electrodes 12a or coated on the surface of the counter electrodes 12a. By doing this, it may become possible to stabilize the reactions for coloring and decoloring in the electrochromic layers 13a, 13b, and 13c.

The white color reflective layer 15 scatter-reflects light incident from the display substrate 11 side. As a material of the white color reflective layer 15, for example, a white pigment particulate film formed of a vacuum coated inorganic compound film of a metal, a semimetal, an oxide, a nitride, a sulfide, or metal oxide particles of titanium oxide, aluminum oxide, zinc oxide, silicon oxide, cesium oxide, yttrium oxide or the like may be used.

To give permeability to the inorganic compound film, it may be necessary to form the inorganic compound film in the same manner as that of the isolation layer. Further, to obtain effective dispersion (scattering), it is preferable that the diameter of the particles in the under coat layer is in a range from 100 nm to 400 nm where higher scattering efficiency may be obtained. Further, the metal oxide particulate film may be easily formed by applying a paste where the metal oxide particles scattered in a solution to form a film. The especially preferable material is titanium oxide particles.

Further, the film thickness of the white color reflective layer 15 is in a range from 0.1 μm to 50 μm, more preferably in a range from 0.5 μm to 5 μm. When the film thickness is less than 0.1 μm, it may become difficult to obtain sufficient white color reflection efficiency. On the other hand, when the film thickness exceeds 50 μm, it may become difficult to obtain both sufficient permeability and film strength at the same time. However, even in a case where a titanium oxide particulate layer is used, when the film thickness is increased until the maximum reflection efficiency is obtained, sufficient film strength is unlikely to be obtained. Therefore, it is preferable to form the white color reflective layer in a manner such that the white color reflective layer has a double-layered structure including the white color reflective layer that can provide the film strength and a white color electrolyte layer where white pigment particles are mixed with the electrolyte layer 14.

Next, with reference to FIGS. 4A through 4D, a case (process) of displaying colors in the electrochromic display device is described.

Namely, FIGS. 4A through 4D schematically illustrate an example where how the display device according to an embodiment is colored and decolored. In the coloring and decoloring processes (mechanism), multiple colors are developed (displayed) based on a subtractive color mixing method using three primary colors. In the following, a specific example of coloring (driving) mechanism is described with reference to the drawings.

Figure 4A:
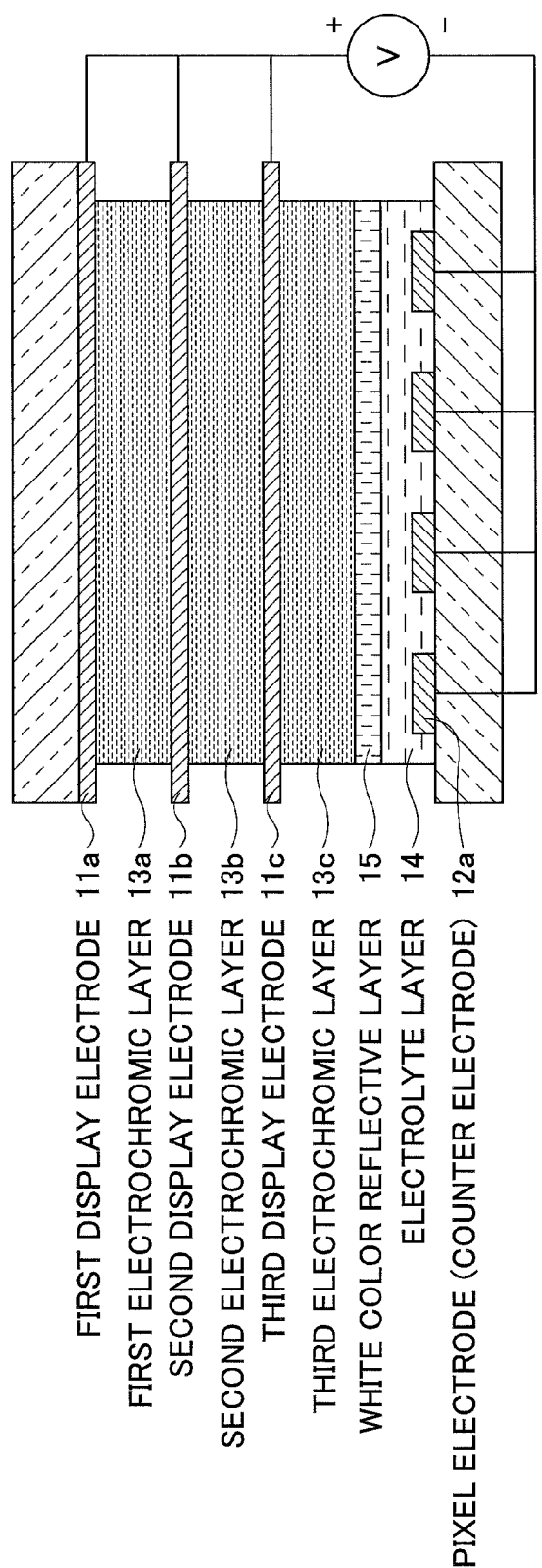
FIGS. 4A through 4D are schematic drawings illustrating a configuration of an electrochromic display device for color display and an operation of coloring and decoloring colors according to an embodiment of the present invention.

[1] As a process (drive) of coloring and decoloring in the display device, to stabilize the developed color density, first, it is preferable to develop colors in the electrochromic layers (FIG. 4A). To make the colors disappear (delete), a positive voltage (decoloring voltage) is applied between the display electrodes on which the respective electrochromic layers are formed and the counter electrodes. It may be possible to apply the decoloring voltage to each of the display electrodes one by one. However, as illustrated in FIG. 4A, it may be faster and preferable when the decoloring voltage is applied between all the display electrodes and the counter electrodes at the same time.

Figure 4B:
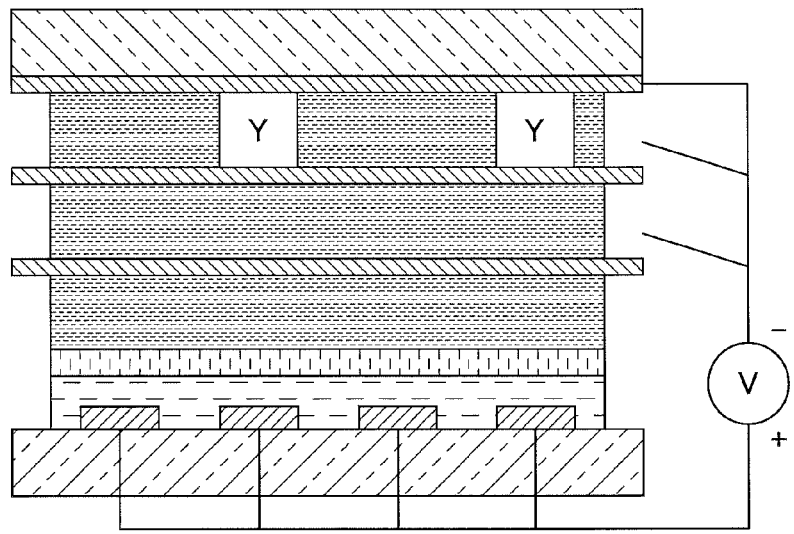

[2] Next, in response to an image signal, a negative voltage (coloring voltage) is applied between the display electrode 11a and the counter pixel electrodes to develop (display) yellow color in the electrochromic layer 13a. The electrochromic layer 13a is formed on the display electrode 11a. In this case, an open circuit is formed between each of the display electrodes other than the display electrode 11a and the counter electrodes (FIG. 4B).

Figure 4C:
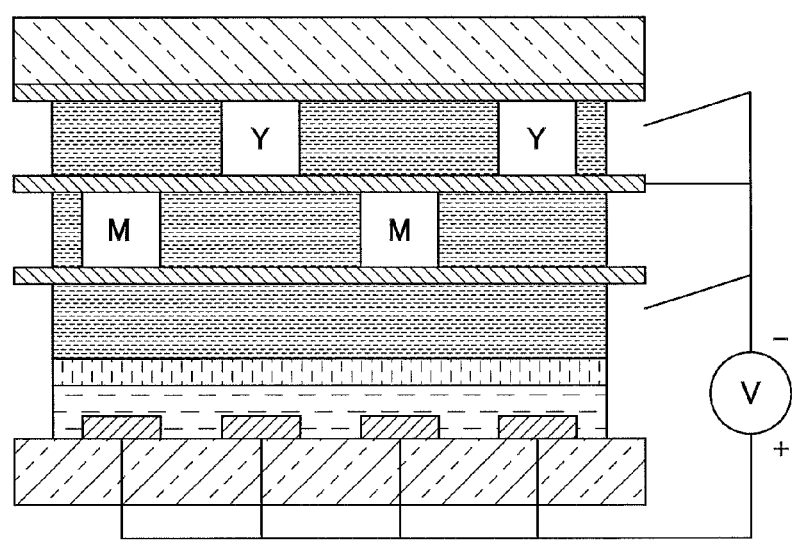

[3] Next, in response to the image signal, the negative voltage (coloring voltage) is applied between the display electrode 11b and the counter pixel electrodes to develop (display) magenta color in the electrochromic layer 13b. The electrochromic layer 13b is formed on the display electrode 11b. In this case, an open circuit is formed between each of the display electrodes other than the display electrode 11b and the counter electrodes (FIG. 4C).

Figure 4D:
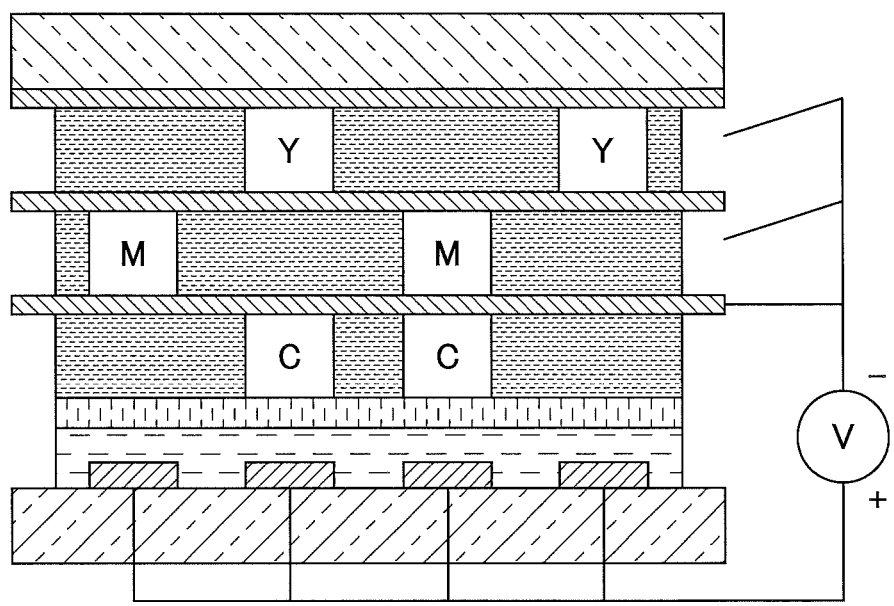

[4] Next, in response to the image signal, the negative voltage (coloring voltage) is applied between the display electrode 11c and the counter pixel electrodes to develop (display) cyan color in the electrochromic layer 13c. The electrochromic layer 13c is formed on the display electrode 11c. In this case, an open circuit is formed between each of the display electrodes other than the display electrode 11c and the counter electrodes (FIG. 4D).

In the example of the driving process, a case is described where colors are developed (displayed) one by one. However, by changing the connections of the display electrodes, it may become possible to develop two or three colors at the same time.

The developed colors may not be influenced (degraded) depending on the order of developing colors when there is sufficient isolation properties maintained between the display electrodes. However, in a case where colors are sequentially developed in the order described above, when, for example, the coloring in the second electrochromic layer is influenced (degraded) by the color display region (Y) in the first electrochromic layer, it is preferable that the coloring/decoloring operation is performed, first, on the display electrode which is the farthest from the counter electrodes (display electrode 11a). This is because that the display electrode disposed outside the region defined by the display electrode where a voltage is applied and the counter electrodes are unlikely to be influenced by the applied voltage. Therefore, it may be easy to color and decolor the color in the selected electrochromic layer.

Due to a variation of color charging conditions in the pixels in the colored state, an excessive decoloring condition (excessive discharge condition) is likely to be generated in a decolored state. Therefore, a failure may occur that a colored state may become unstable and the device may be damaged. Therefore, it is preferable to perform control to change the charge amount to be applied to the pixels formed by the display electrodes and counter electrodes.

As described above, by controlling to change the charge amount to be applied to the pixels based on the charged amount of the electrochromic layer and/or the voltage difference from other display electrodes, it may become possible to adjust the coloring and decoloring state to a desired state for each of the pixels. The charge amount may be monitored based on the voltage and the resistor value. Further, it is preferable to control the charge amount applied to the pixels depending on the formed color density and adjust the time period to select (turns on an off) the display electrodes based on the time period when the charge amount is applied. By adjusting the time period to select the display electrode for each of the pixels, when an image having a lower color density is displayed, it may be possible to set a shorter time period to select the display electrode. As a result, it may become possible to reduce the time to display the image and increase the processing speed.

FIGS. 4A through 4D illustrates a case using the electrochromic layers in which colors are developed when a reduction reaction is performed. However, it may be possible to similarly develop colors when an oxidation reaction is performed by reversing the voltage polarities.

As illustrated in the electrochromic display device of FIGS. 1 through 3, the counter electrode is divided based on the pixels, so that the display electrodes may become larger than the pixels. By doing this, it may become possible to dispose the pixel electrode part having a lower light transmission rate due to the drive circuit such as TFT on the rear counter side and use the sheet electrodes having a higher light transmission rate such as ITO as the display electrodes. As a result, it may become possible to easily provide an electrochromic display device having excellent light use efficiency, color quality, faster response speed of coloring and decoloring, and excellent memory characteristics. Further, by forming the counter electrodes as active-matrix pixel electrodes, it may becomes possible to perform active display.

EXAMPLES

In the following, an embodiment of the present invention is described in more detail with reference to examples and comparative examples. However, it is noted that the present invention is not limited to these examples.

Example 1

[Manufacturing Electrochromic Display Device]
<Form of Display Electrode, Electrochromic Layer, and White Color Reflective Layer>

As the display electrode, a glass substrate having sizes of 40 mm (vertical) by 40 mm (lateral) and a thickness of 0.7 mm was provided. On this glass substrate, an ITO film having a thickness of approximately 100 nm was formed to form the display electrode 11a.

Next, titanium oxide particle dispersion liquid (product name: SP210 by Showa titanium Co., Ltd. average particle diameter: approximately 20 nm) was coated using a spin coat method. Then, the annealing treatment to heat at a temperature of approximately 120° C. for approximately 15 minutes was performed to form a titanium oxide particulate film (formed of a nano-structure semiconductor material) having a thickness of approximately 1.0 μm. Next, 2,2,3,3-tetrafluoropropanol solution containing 1.5 wt % of compound represented by the following structural formula (3) as the electrochromic compound was applied by the spin coat method. Then, the annealing treatment to heat at a temperature of approximately 120° C. for approximately 10 minutes was performed to be carried (adsorbed) on the titanium oxide particulate film to form the electrochromic layer.

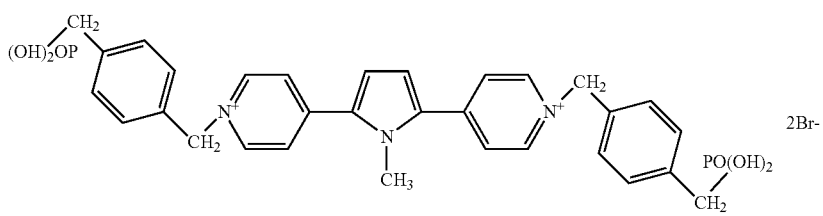

(3)

Further, 10 wt % of urethane paste (product name: HW140SF, DIC) as a binding agent was dissolved in the 2,2,3,3-tetrafluorophloropropanol solution to prepare a solution. Further, 50 wt % of titanium oxide particles (product name: CR90, Ishihara Sangyo Kaisha, Ltd., average particle diameter: approximately 250 nm) were dispersed in the solution to prepare a paste. Further, the paste was applied on the electrochromic layer by the spin coat method, and heated at a temperature of approximately 120° C. for approximately 5 minutes by the anneal treatment to form the white color reflective layer having the thickness of approximately 1 µm.

<Form of Counter Electrode/Electrolyte Layer>
(Form of Counter Electrode)

A glass substrate having sizes of 32 mm (vertical) by 40 mm (lateral) and a thickness of 0.7 mm was provided. On this glass substrate, as the counter electrode 12a, a rectangular ITO pattern film having 4 mm line/1 mm space (6 line) and the width of 35 mm was formed by a sputtering method so that thickness of the ITO pattern film becomes approximately 10 nm.

(Form of Electrolyte Layer)

Next, as the electrolyte layer, 1.5 wt % of tetrabutylammonium hexafluorophosphate salt (electrolyte) was mixed with 4-cyano-4'-pentylbiphenyl (product name: C1550, Tokyo Chemical Industry Co., Ltd., molecular weight: 249) (liquid crystal solvent), and the mixed materials are heated to be dissolved to prepare a mixture (solution: ion conductor).

<Manufacturing of Electrochromic Display Device>

The ion conductor was dropped and applied onto the surface of the white color reflective layer. Then, the white color reflective layer was disposed on the surface of the counter electrode to manufacture the display device having the configuration (electrochromic display device 10) illustrated in FIG. 1. The thickness of the electrolyte layer was set to 5 µm by mixing 0.2 wt % of beads spacer in the electrolyte layer.

Figure 5:
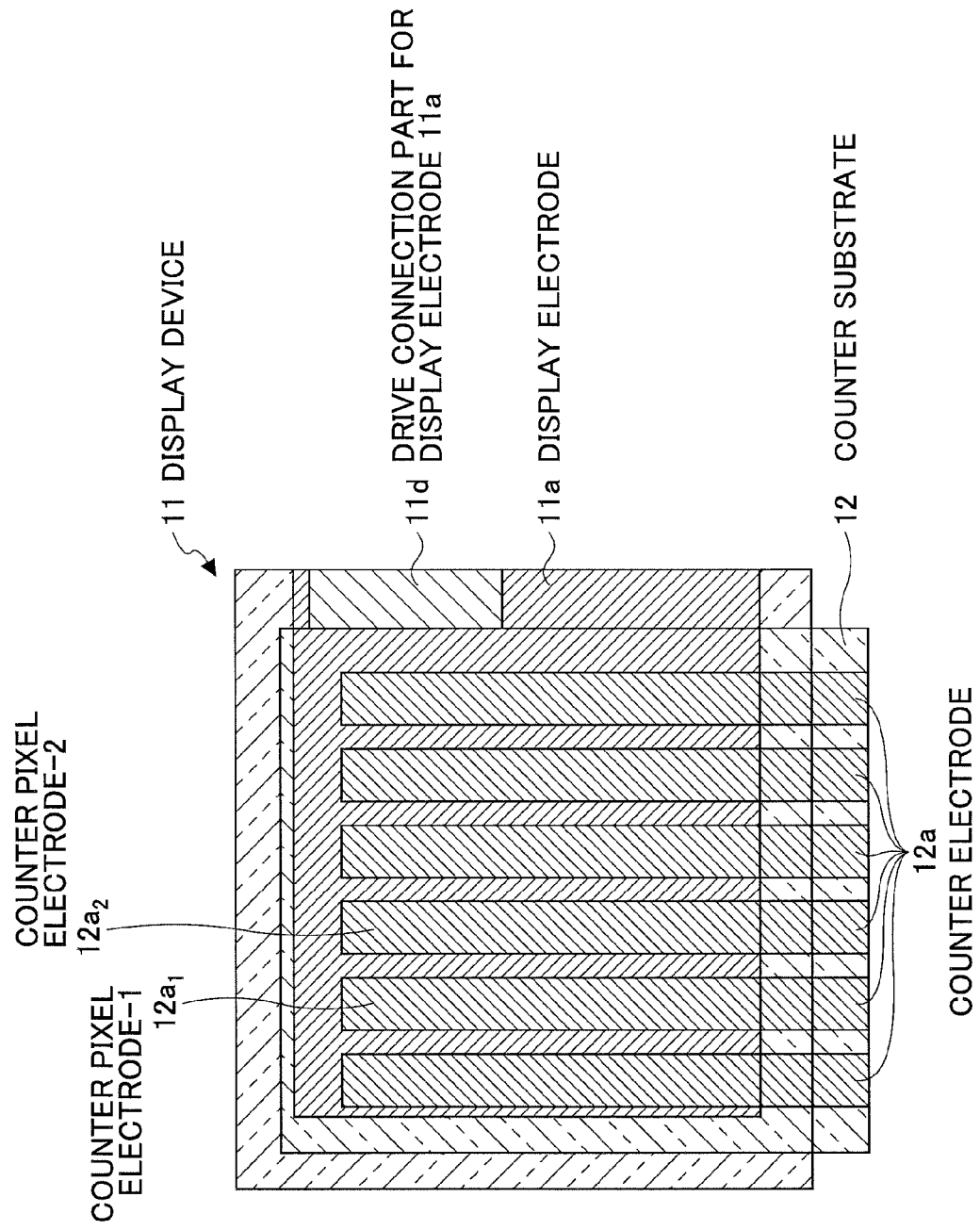
FIG. 5 is a schematic plane view of an electrode configuration of an electrochromic display device manufactured in an example according to an embodiment of the present invention.

FIG. 5 is a schematic plane view illustrating an electrode configuration of the electrochromic display device manufactured in the example.

As illustrated in FIG. 5, the electrochromic display device includes the display substrate 11, the display electrode 11a, a drive connection part 11d corresponding to the display electrode 11a, the counter substrate 12, and the counter electrodes 12a. The counter electrode 12a includes a counter pixel electrode-1 $12a_1$ and a counter pixel electrode-2 $12a_2$.

In the following (description), the electrochromic display device, the electrolyte layer, and the low-molecular liquid crystal material may be called the display device, the electrolytic layer, and the liquid crystal material, respectively.

<Confirmation of Coloring/Decoloring Reaction>

The drive connection part 11d of the display electrode 11a of the display device 10 is connected to a negative electrode of a voltage source, and the counter pixel electrode-1 $12a_1$ and the counter pixel electrode-2 $12a_2$ of the counter electrode 12a of the electrochromic display device 10 is connected to a positive electrode of the voltage source. Then, a voltage of 5.0 V is applied for one second. As a result, magenta color is developed in the electrochromic layer 13a and along the ITO pattern shape of the counter pixel electrode-1 $12a_1$ and the counter pixel electrode-2 $12a_2$.

Next, a voltage of −5.0 V is applied (display electrode 11a: positive electrode, the counter pixel electrode-1 $12a_1$ and the counter pixel electrode-2 $12a_2$ of the counter electrode 12a: negative electrode) for two seconds. As a result, the magenta color completely disappeared and retuned to a white color. Further, a voltage of 5.0 V is applied (display electrode 11a: negative electrode, the counter pixel electrode-1 $12a_1$ and the counter pixel electrode-2 $12a_2$ of the counter electrode 12a: positive electrode) for one second and then, no voltage was applied for five minutes. As a result, the developed magenta color (i.e., developed color pattern) was maintained during the five minutes. Therefore, excellent memory characteristics were observed (confirmed).

The white reflection rate in the decolored state of this electrochromic display device from the display substrate side was measured by using a spectrophotometiric meter (Product name: LCD-5000, Otsuka Electronics Co., Ltd.). As a result, the white reflection rate was approximately 50%.

<Impedance Measurement>

Figure 6:
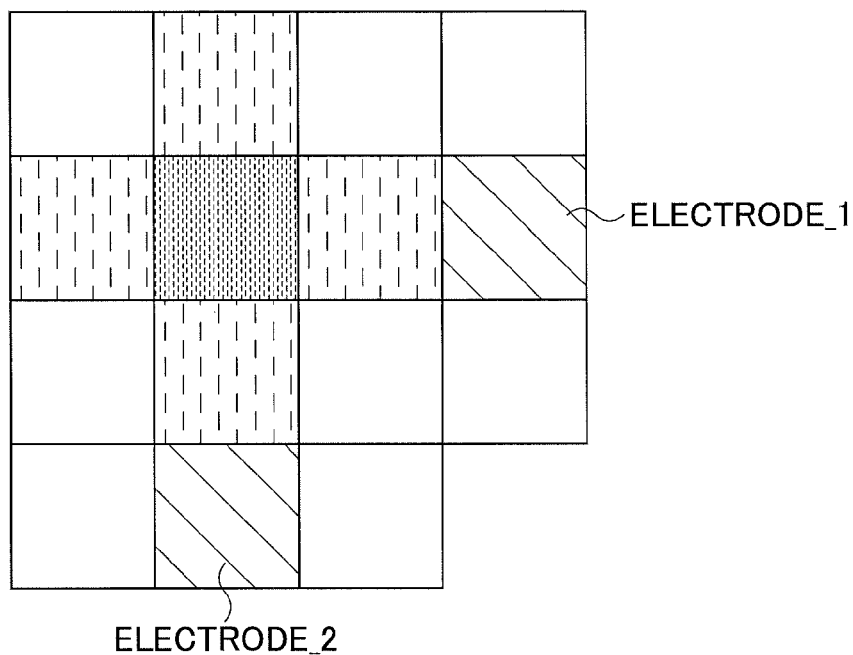
FIG. 6 is a schematic plane view of an electrode configuration manufactured for impedance measurement in an example according to an embodiment of the present invention.

Further, as schematically illustrated in FIG. 6, two pieces of glasses on which ITO electrode is formed are disposed in a manner such that the glasses face each other and the surfaces where the ITO electrode is formed are disposed inside of the glasses facing each other. Then, the glasses are pasted using 100 µm of seal spacer, and the ion conductor was introduced in the electrolyte layer to manufacture a cell for measuring the impedance. Here, the cross section (where a voltage is applied) of the ITO electrode was formed so as to be 1 centimeters square.

By using this cell, the AC impedance (values) were measured when a voltage of 0.1 V and a voltage of 5V were separately applied. The AC impedance was measured by using an impedance analyzer SI1260 and a dielectric interface 1296 (Toyo Corporation, Solartron/Schlumberger). The impedance of the electrolyte layer was calculated based on a Nyquist diagram. The impedance change rate(%) was calculated based on the following formula.

Figure 7:
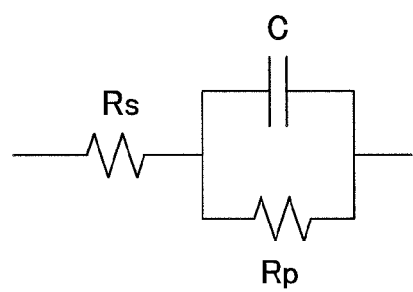
FIG. 7 is a schematic drawing illustrating a circuit configuration used for the impedance measurement according to the embodiment of the present invention.

The impedance value was calculated as the "Rp" illustrated in the circuit configuration of FIG. 7.

Impedance change rate(%)=[([$R_{0.1}$]−[$R_5$])/[$R_{0.1}$]]×100

(Wherein, [$R_{0.1}$] denotes the AC impedance when a voltage of 0.1 V is applied, [$R_5$] denotes the AC impedance when a voltage of 5 V is applied.)

As a result of the measurement, the impedance when 5V was applied was less than (reduced from) that when 0.1 V was applied by approximately 25%. Further, the orientation of the liquid crystal as a drive response when a voltage was applied was visually observed as the change of the light transmission rate.

Table 1 collectively illustrates evaluation results (coloring characteristics, memory characteristics) of the electrolyte layer (liquid crystal material, electrolyte and the like) and display device and evaluation results (impedance, voltage response and the like) of the electrolyte layer cell used in Example 1.

Example 2

In Example 2, the display device and the impedance measurement cell were manufactured in the same manner as in Example 1 except that 4-cyano-4'-pentylbiphenyl (product name: C1550, Tokyo Chemical Industry Co., Ltd., molecular weight: 249) as the liquid crystal material of the electrolyte layer used in Example 1 was replaced by a mixture of 4-cyano-4'-pentylbiphenyl and 4-cyano-4'-pentyloxybiphenyl (product name: C1551, Tokyo Chemical Industry Co., Ltd., molecular weight: 267) (weight composition ratio: 7/3). Then, the display device and the impedance measurement cell of Example 2 were evaluated. Table 1 further collectively illustrates evaluation results (coloring characteristics, memory characteristics) of the electrolyte layer (liquid crystal material, electrolyte and the like) and display device and evaluation results (impedance, voltage response and the like) of the electrolyte layer cell used in Example 2. As a result, similar to Example 1, it was possible to detect (observe) the coloring/decoloring response, and excellent memory characteristics were also confirmed (observed).

Example 3

In Example 3, the display device and the impedance measurement cell were manufactured in the same manner as in Example 2 except that the amount of electrolyte (1.5 wt % mixture) in Example 2 was replaced by a larger amount of electrolyte (2 wt % mixture). Then, the display device and the impedance measurement cell of Example 3 were evaluated. Table 1 further collectively illustrates evaluation results (coloring characteristics, memory characteristics) of the electrolyte layer (liquid crystal material, electrolyte and the like) and display device and evaluation results (impedance, voltage response and the like) of the electrolyte layer cell used in Example 3. As a result, similar to Example 1, it was possible to detect (observe) the coloring/decoloring response, and also excellent memory characteristics were confirmed (observed).

Example 4

In Example 4, the display device and the impedance measurement cell were manufactured in the same manner as in Example 2 except that the amount of electrolyte (1.5 wt % mixture) in Example 2 was replaced by a lesser amount of electrolyte (0.5 wt % mixture). Then, the display device and the impedance measurement cell of Example 4 were evaluated. Table 1 further collectively illustrates evaluation results (coloring characteristics, memory characteristics) of the electrolyte layer (liquid crystal material, electrolyte and the like) and display device and evaluation results (impedance, voltage response and the like) of the electrolyte layer cell used in Example 4. Here, the thickness of the cell for impedance measurement is set to 5 μm similar to that of the display device (electrolyte layer). As a result, similar to Example 1, it was possible to detect (observe) the coloring/decoloring response, and excellent memory characteristics were confirmed (observed).

Example 5

In Example 5, the display device and the impedance measurement cell were manufactured in the same manner as in Example 1 except that the liquid crystal compound (4-cyano-4'-pentylbiphenyl) used in Example 1 was replaced by BL024 (Merk and Co. Inc., low-molecular nematic liquid crystal mixture (molecular weight: 1,000 or less)) and also the amount of electrolyte (1.5 wt % mixture) was replaced by a lesser amount of electrolyte (0.2 wt % mixture). Then, the display device and the impedance measurement cell of Example 5 were evaluated. Table 1 further collectively illustrates evaluation results (coloring characteristics, memory characteristics) of the electrolyte layer (liquid crystal material, electrolyte and the like) and display device and evaluation results (impedance, voltage response and the like) of the electrolyte layer cell used in Example 5. However, the voltage value for coloring and decoloring was set to 8 V. As a result, similar to Example 1, it was possible to detect (observe) the coloring/decoloring response, and excellent memory characteristics were confirmed (observed).

Example 6

In Example 6, the display device and the impedance measurement cell were manufactured in the same manner as in Example 5 except that the electrolyte (1.5 wt % of tetrabutylammonium hexafluorophosphate salt) was replaced by 1.0 wt % of tetrabutylammonium perchlorate salt, and 10 wt % of propylene carbonate ("PC") was added as a solvent. Then, the display device and the impedance measurement cell of Example 6 were evaluated. Table 1 further collectively illustrates evaluation results (coloring characteristics, memory characteristics) of the electrolyte layer (liquid crystal material, electrolyte and the like) and display device and evaluation results (impedance, voltage response and the like) of the electrolyte layer cell used in Example 5. As a result, similar to Example 1, it was possible to detect (observe) the coloring/decoloring response, and also excellent memory characteristics were confirmed (observed).

Comparative Example 1

In Comparative example 1, the display device and the impedance measurement cell were manufactured in the same manner as in Example 1 except that no liquid crystal material was used, propylene carbonate ("PC") was prepared as a solvent, the content amount of the electrolyte (tetrabutylammonium hexafluorophosphate salt) was changed from 1.5 wt % to 2 wt %, and also 10 wt % of propylene carbonate ("PC") was added as solvent. Then, the display device and the impedance measurement cell of Comparative example 1 were evaluated. Table 1 further collectively illustrates evaluation results (coloring characteristics, memory characteristics) of the electrolyte layer (liquid crystal material, electrolyte and the like) and display device and evaluation results (impedance, voltage response and the like) of the electrolyte layer cell used in Comparative example 1. Here, the electrolyte was a solution (liquid) and is not adopted to the evaluation cell. Therefore, the impedance measurement was omitted. As a result, it was possible to detect (observe) the coloring/decoloring response. However, a blur was generated within thirty seconds, so that the pattern was blurred beyond recognition.

Comparative Example 2

In Comparative example 2, the display device and the impedance measurement cell were manufactured in the same manner as in Example 1 except that no liquid crystal material was used, polyethyleneglycol having a molecular weight of 200 (PEG200) was prepared as a solvent the content, amount of the electrolyte (tetrabutylammonium hexafluorophosphate salt) was changed from 1.5 wt % to 2 wt %, the electrolyte was mixed with PEG200 to prepare a solution, and the solution was used. Then, the display device and the impedance measurement cell of Comparative example 2 were evaluated. Table 1 further collectively illustrates evaluation results (coloring characteristics, memory characteristics) of the electrolyte layer (liquid crystal material, electrolyte and the like) and display device and evaluation results (impedance, voltage response and the like) of the electrolyte layer cell used in Comparative example 2. As a result, it was possible to detect (observe) the coloring/decoloring response. However, a blur was generated within one minute, so that the pattern was blurred beyond recognition.

Comparative Example 3

In Comparative example 3, the display device and the impedance measurement cell were manufactured in the same manner as in Example 1 except that no liquid crystal material was used, polyethyleneglycol having a molecular weight of 400 (PEG400) was prepared as a solvent, the content amount of the electrolyte (tetrabutylammonium hexafluorophosphate salt) was changed from 1.5 wt % to 10 wt %, the electrolyte was mixed with PEG400 to prepare solution, and the solution was used. Then, the display device and the impedance measurement cell of Comparative example 3 were evaluated. Table 1 further collectively illustrates evaluation results (coloring characteristics, memory characteristics) of the electrolyte layer (liquid crystal material, electrolyte and the like) and display device and evaluation results (impedance, voltage response and the like) of the electrolyte layer cell used in Comparative example 3. As a result, it was possible to detect (observe) the coloring/decoloring response. However, a blur was generated within one minute, so that the pattern was blurred beyond recognition.

TABLE 1

| | ELECTROLYTE LAYER | | | | | EVALUATION OF DISPLAY DEVICE | |
|---|---|---|---|---|---|---|---|
| EXAMPLE | LIQUID CRYSTAL MATERIAL | ELEC-TROLYTE | ELEC-TROLYTE CONTENT (wt %) | SOLVENT | SOLVENT CONTENT (wt %) | COLORING CHARAC-TERISTICS | MEMORY CHARAC-TERISTICS |
| EXAMPLE 1 | C1550 | TBA PF6 | 1.5 | NONE | — | ○: COLOR DEVELOPED | ○: MAINTAINED FOR 5 MIN. |
| EXAMPLE 2 | C1550/C1551 (7/3) | TBA PF6 | 1.5 | NONE | — | ○: COLOR DEVELOPED | ○: MAINTAINED FOR 5 MIN. |
| EXAMPLE 3 | C1550/C1551 (7/3) | TBA PF6 | 2 | NONE | — | ○: COLOR DEVELOPED | ○: MAINTAINED FOR 5 MIN. |
| EXAMPLE 4 | C1550/C1551 (7/3) | TBA PF6 | 0.5 | NONE | — | ○: COLOR DEVELOPED | ○: MAINTAINED FOR 5 MIN. |
| EXAMPLE 5 | BL024 | TBA PF6 | 0.2 | NONE | — | ○: COLOR DEVELOPED | ○: MAINTAINED FOR 5 MIN. |
| EXAMPLE 6 | BL024 | TBA ClO4 | 1 | PC | 10 | ○: COLOR DEVELOPED | ○: MAINTAINED FOR 5 MIN. |
| COMPARABLE EXAMPLE 1 | — | TBA PF6 | 2 | PC | 98 | ○: COLOR DEVELOPED | X: DISAPPEARED WITHIN 30 S |
| COMPARABLE EXAMPLE 2 | — | TBA PF6 | 2 | PEG 200 | 98 | ○: COLOR DEVELOPED | X: DISAPPEARED WITHIN 1 MIN. |
| COMPARABLE EXAMPLE 3 | — | TBA PF6 | 10 | PEG 400 | 90 | ○: COLOR DEVELOPED | X: DISAPPEARED WITHIN 1 MIN. |

| | EVALUATION OF ELECTROLYTE-LAYER CELL | | | | |
|---|---|---|---|---|---|
| | | IMPEDANCE | | IMPEDANCE | |
| EXAMPLE | GAP (μm) | APPLI-CATION OF 0.1 V | APPLI-CATION OF 5 V | CHANGE (REDUCTION) RATE (%) | VOLTAGE RESPONSE |
| EXAMPLE 1 | 100 | 2.55E+4 | 1.91E+4 | 25 | ○: RESPONDED TO ORIENT |
| EXAMPLE 2 | 100 | 2.80E+4 | 2.08E+4 | 26 | ○: RESPONDED TO ORIENT |
| EXAMPLE 3 | 100 | 2.32E+4 | 1.86E+4 | 20 | ○: RESPONDED TO ORIENT |
| EXAMPLE 4 | 5 | 2.6E+3 | 1.7E+3 | 35 | ○: RESPONDED TO ORIENT |
| EXAMPLE 5 | 5 | 2.1E+4 | 1.3E+4 | 38 | ○: RESPONDED TO ORIENT |
| EXAMPLE 6 | 5 | 6.4E+2 | 3.7E+2 | 42 | ○: RESPONDED TO ORIENT |
| COMPARABLE EXAMPLE 1 | — | — | — | — | X: NOT RESPONDED |

TABLE 1-continued

| | | | | | |
|---|---|---|---|---|---|
| COMPARABLE EXAMPLE 2 | 100 | 7.4E+2 | 6.4E+2 | 14 | X: NOT RESPONDED |
| COMPARABLE EXAMPLE 3 | 100 | 1.8E+3 | 1.6E+3 | 11 | X: NOT RESPONDED |

C1550: 4-CYANO-4'-PENTYLBIPHENYL
C1551: 4-CYANO-4'-PENTYLPXYBIPHENYL
TAB PF6: TETRABUTYLAMMONIUM HEXAFLUOROPHOSPHATE SALT
TAB CI04: TETRABUTYLAMMONIUM PERCHLORATE SALT
PC: PROPYLENE CARBON
PEG 200: PROPYLENEGLYCOL, MOLECULAR WEIGHT 200
PEG 400: PROPYLENEGLYCOL, MOLECULAR WEIGHT 400

As illustrated in Table 1, according to the evaluation result of any of the display devices including the electrolyte layers formed of the ion conductor according to an embodiment and manufactured in Examples 1 through 6, excellent coloring characteristics and memory characteristics were detected (observed). Similarly, in the evaluation results of the impedance measurement cell, it was detected (observed) that the impedance may be controlled by the applied voltage (control voltage) so that the impedance reduction (change) rate of any of the display devices in Examples 1 through 6 was 20% or more. Further, excellent orientation response of the liquid crystal was also detected. Namely, in any of the electrolyte layers of the display devices according to an embodiment and manufactured in Example 1 through 6, and in any of the electrolyte layers of the cells for impedance measurement, a low-volatile liquid crystal is used as a main component of the electrolyte layers. Therefore, the display device according to an embodiment may have a higher reliability. Further, by applying a drive voltage, the liquid crystal of the electrolyte layer responds to orientation. Therefore, excellent color-decolor response and memory characteristics may be obtained.

On the other hand, as illustrated in Table 1, according to the evaluation result of any of the display devices including the electrolyte layers where no low-molecular liquid crystal material was contained, it was possible to detect the coloring/decoloring response. However, the blur was generated within thirty seconds to one minute, so that the pattern was blurred beyond recognition. Also, no sufficient memory characteristics were observed. Further, in the evaluation result of the cell for the impedance measurement, in any of the cells, the impedance reduction rate was less than 20%, so that impedance was not controlled by the applied voltage. Also, no orientation response was observed.

The above results shows that by using, as the electrolyte layer, a mixture (ion conductor) of electrolyte and a low-molecular liquid crystal material, the electrolyte containing a salt including at least inorganic or organic pairs of negative and positive ions, it may become possible to maintain sufficient color density while no electric field (voltage) is applied after the color has been developed in the electrochromic layer so as to provide excellent image memory characteristics. Further, it may become possible to prevent the generation of the blur of color in an uncolored region, reduce the blur in an image, and display a clear image.

Therefore, the electrochromic display device that may realize excellent color/decolor response, memory characteristics to maintain image for a longer period without applied voltage, the reduction of blur in an image according to an embodiment of the present invention may be used as, for example, a rewritable paper-like display device as a image display device having, for example, excellent display quality and low energy consumption while being operated.

According to an embodiment of the present invention, an ion conductor includes a mixture that including an electrolyte including a salt including inorganic or organic pairs of negative and positive ions, and a low-molecular liquid crystal material. Further, an impedance of the ion conductor varies in accordance with an increase of a voltage applied to the ion conductor due to an orientation response of the low-molecular liquid crystal material, the impedance being determined by an AC impedance method.

According to an embodiment of the present invention, an electrochromic display device includes a display substrate; a display electrode; a counter substrate; one or more counter electrodes; an electrochromic layer formed so as to be in contact with a surface of the display electrode, the surface facing the counter electrodes; and an electrolyte layer formed between the display electrode and the counter electrodes. Further, the electrochromic layer is configured to color and decolor a color in the electrochromic layer in accordance with redox reactions in the electrochromic layer, and the electrolyte layer includes the ion conductor described above.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An ion conductor comprising:
a mixture including
an electrolyte including a salt including inorganic or organic pairs of negative and positive ions, and
a low-molecular liquid crystal material,
wherein an impedance of the ion conductor varies in accordance with an increase of a voltage applied to the ion conductor due to an orientation response of the low-molecular liquid crystal material, the impedance being determined by an AC impedance method, and
wherein an impedance change rate (%) calculated based on the following formula is equal to or greater than 20 (%):

$$\text{impedance change rate (\%)} = [([R_{0.1}] - [R_m])/[R_{0.1}]] \times 100$$

wherein "$[R_{0.1}]$" denotes AC impedance when 0.1 V is applied, and "$[R_m]$" denotes the AC impedance when a control voltage is applied.

2. The ion conductor according to claim 1, wherein the low-molecular liquid crystal material is a nematic liquid crystal.

3. The ion conductor according to claim 1, wherein the low-molecular liquid crystal material includes a biphenyl derivative containing a cyano group.

4. The ion conductor according to claim 1,
wherein the electrolyte is a quaternary ammonium salt.

5. An electrochromic display device comprising:
a display substrate;
a display electrode;
a counter substrate;
one or more counter electrodes;
an electrochromic layer formed so as to be in contact with a surface of the display electrode, the surface facing the counter electrodes; and
an electrolyte layer formed between the display electrode and the counter electrodes,
wherein the electrochromic layer is configured to color and decolor a color in the electrochromic layer in accordance with redox reactions in the electrochromic layer, and
wherein the electrolyte layer includes the ion conductor according to claim 1.

6. An electrochromic display device comprising:
a display substrate;
a counter substrate;
one or more counter electrodes formed on the counter substrate;
an electrolyte layer formed between the display electrode and the counter electrodes;
a plurality of display electrodes formed between the display substrate and the counter electrodes in a manner such that the plurality of display electrodes are separated from each other; and
an electrochromic layer formed on each of the plurality of display electrodes so as to face the counter electrodes;
wherein the electrochromic layer is configured to color and decolor a color in the electrochromic layer in accordance with redox reactions in the electrochromic layer, and
wherein the electrolyte layer includes the ion conductor according to claim 1.

7. An electrochromic display device according to claim 5,
wherein the electrolyte layer includes a mixture of an electrolyte and a biphenyl derivative, the electrolyte including a quaternary ammonium salt, the biphenyl derivative including a cyano group.

8. An electrochromic display device according to claim 5,
wherein in the electrolyte layer including the ion conductor, a content amount of the electrode including a salt including inorganic or organic pairs of negative and positive ions is equal to or greater than 0.2 wt % and equal to or less than 2.0 wt %.

9. An electrochromic display device according to claim 5,
wherein the electrolyte layer includes the ion conductor and a solvent, and
wherein a content of the solvent relative to a total content of the electrolyte layer is equal to or less than 10 wt %.

10. An electrochromic display device according to claim 5,
wherein in the electrochromic layer, an electrochromic compound is carried on a nano-structure semiconductor material.

11. An electrochromic display device according to claim 5,
wherein the counter electrodes are divided into pixels and the display electrode is formed so as to be larger than the pixels.

12. An electrochromic display device according to claim 5,
wherein a liquid crystal orientation layer is formed on a surface of the counter electrode.

* * * * *